United States Patent
Hines

[11] Patent Number: 5,669,744
[45] Date of Patent: Sep. 23, 1997

[54] ROTARY CHISEL

[76] Inventor: Donald G. Hines, 1516 S. Jefferson, Casper, Wyo. 82601

[21] Appl. No.: 583,613

[22] Filed: Jan. 5, 1996

[51] Int. Cl.⁶ .................. B23C 1/20; B23C 5/02
[52] U.S. Cl. .......... 409/181; 409/143; 30/500; 144/218; 144/136.95; 144/154.5; 407/42; 407/114; 407/56; 407/30
[58] Field of Search .................. 407/113, 114, 407/42, 30, 56; 144/218, 219, 136.95, 154.5; 30/388, 167, 500; 409/143

[56] References Cited

U.S. PATENT DOCUMENTS

| | | | |
|---|---|---|---|
| D. 333,077 | 2/1993 | Mikiya | D8/62 |
| 3,283,663 | 11/1966 | Davis | 407/56 |
| 3,759,625 | 9/1973 | Iverson | 407/113 |
| 4,269,244 | 5/1981 | Kinsella | 407/113 |
| 4,666,349 | 5/1987 | Altmeyer et al. | 407/118 |
| 4,687,383 | 8/1987 | Shimomura et al. | 407/46 |
| 4,850,407 | 7/1989 | Inkster et al. | 144/154.5 |
| 5,238,074 | 8/1993 | Tibbitts et al. | 175/428 |
| 5,331,743 | 7/1994 | Lump | 30/388 |
| 5,348,065 | 9/1994 | Meyer | 407/113 |

FOREIGN PATENT DOCUMENTS

| | | | |
|---|---|---|---|
| 3319642 A1 | 12/1984 | Germany | 407/30 |
| 876315 | 10/1981 | U.S.S.R. | 407/113 |

*Primary Examiner*—Daniel W. Howell
*Assistant Examiner*—Christopher Kirkman
*Attorney, Agent, or Firm*—Dean P. Edmundson

[57] ABSTRACT

A high-speed carbide rotary cutting tool designed for use in the carving, cutting and shaping of most materials including, but not limited to, wood, ferrous and non-ferrous metals, bone, stone, plastics and composites. It is designed for use in high-speed, hand-held rotary grinders, such as flex shaft hand pieces, die grinders, and other high-speed stationary grinding tools, primarily using ¼ inch and ⅛ inch shaft sizes. The tool includes a triangular solid carbide cutting head shaped for cutting different profiles. The cutting head is brazed to a mandrel in such a manner as to render the tool one piece.

6 Claims, 3 Drawing Sheets

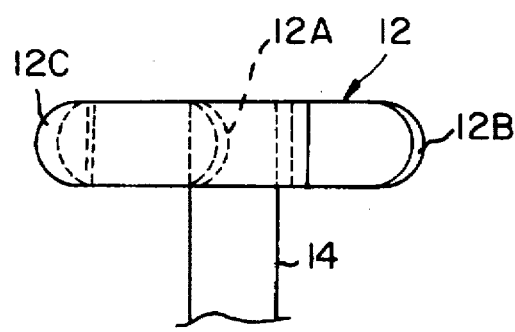
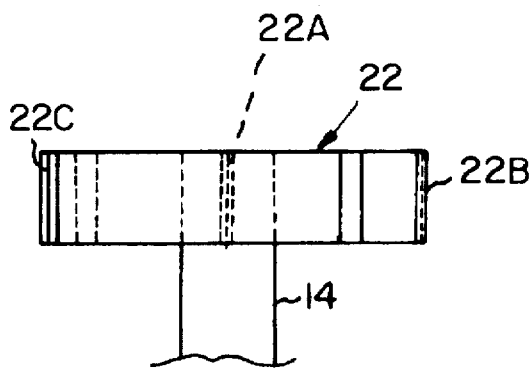
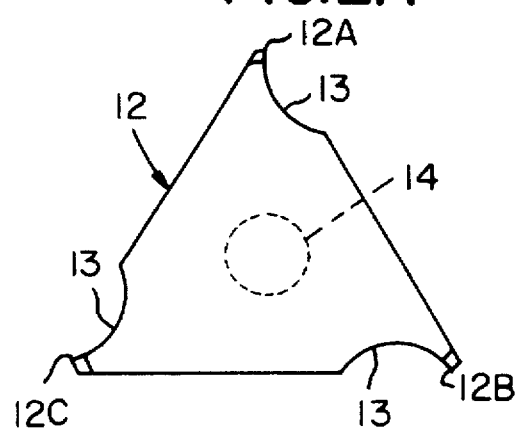
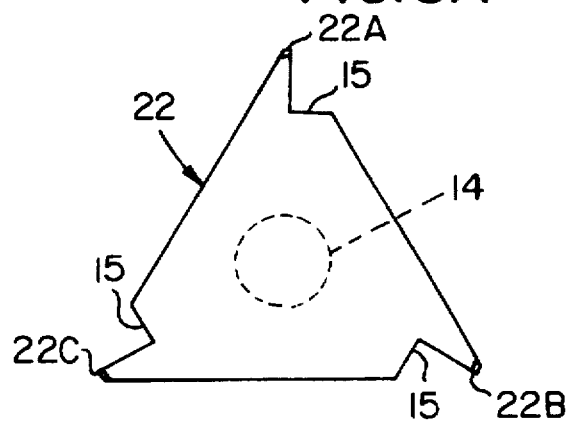

ROTARY CHISEL

FIELD OF THE INVENTION

This invention relates to cutting tools. More particularly, this invention relates to rotary chisels. Even more particularly, this invention relates to hand-held rotary cutting tools for use in carving or cutting a variety of materials.

BACKGROUND OF THE INVENTION

Sculptors and other craftsmen who cut and shape raw material (e.g., wood, metal, stone, etc.) use a variety of tools such as chisels, grinders, saws, etc. Such tools are sometimes cumbersome to use, difficult to control, and inefficient for certain operations. Manual chisels are slow and inefficient, and grinding stones are not suitable for use on all materials nor are they efficient for creating certain surface profiles on various materials. Although a router can be used for creating cuts and shaping some materials (e.g., wood), it is not suitable for all materials. Also, use of a router bit is limiting because the user cannot see the bit beneath the router. Further, a router bit can build up heat when it is used for cutting or shaping some materials.

There has not heretofore been provided a cutting tool which has all of the advantages and features provided by the present invention.

SUMMARY OF THE INVENTION

In accordance with the present invention there is provided a high-speed carbide rotary cutting tool designed for use in the carving, cutting and shaping of most materials including, but not limited to, wood, ferrous and non-ferrous metals, bone, stone, plastics and composites. It is designed for use in high speed, hand-held rotary grinders (such as flex shaft hand pieces), die grinders, and other high speed stationary grinding tools, primarily using ¼ inch and ⅛ inch shaft sizes. The tool comprises, in one embodiment, a triangular solid carbide cutting head shaped for cutting different profiles. The cutting head is brazed to a mandrel in such a manner as to render the tool one piece. The mandrel is composed of tool steel or the like and is secured to the cutting head so as to be perpendicular to the plane of the cutting head.

The cutting head preferably includes three equidistantly spaced cutting edges in the same plane about the periphery of the cutting head. The mandrel or shaft can be readily attached to and driven by a conventional hand-held die grinder power unit, for example. Because the head has three spaced-apart cutting edges, the head can dissipate heat very readily during use.

The tool enables the user to make all desired cuts in a material in a free-hand manner, and the tool removes material from a workpiece much faster and more efficiently than is possible with conventional hand-held chisels or rotary files. The contours of the cutting surfaces enable the user to cut and remove material so as to leave a desired texture or shape on the material being worked. Because the cutting head is exposed on the outer end of the mandrel or shaft, the user can readily observe the cutting action in progress. This enables the user to carefully control the location and the extent of the cutting.

The thickness of the cutting head may vary. Also, the profile of the three cutting edges on the head may vary. Each corner or cutting edge of the cutting head is shaped to a specific profile and sharpened so that each cutting edge will work efficiently.

Other advantages of the rotary chisel of the invention will be apparent from the following detailed description and the accompanying drawings.

BRIEF DESCRIPTION OF THE DRAWINGS

The invention is described in more detail hereinafter with reference to the accompanying drawings, wherein like reference characters refer to the same parts throughout the several views in which:

FIG. 2A and 2B are top and side elevational views, respectively, of one embodiment of rotary cutting tool of the invention;

FIGS. 3A and 3B are top and side elevational views of another embodiment of rotary cutting tool of the invention.

DETAILED DESCRIPTION OF THE INVENTION

Figure 1:
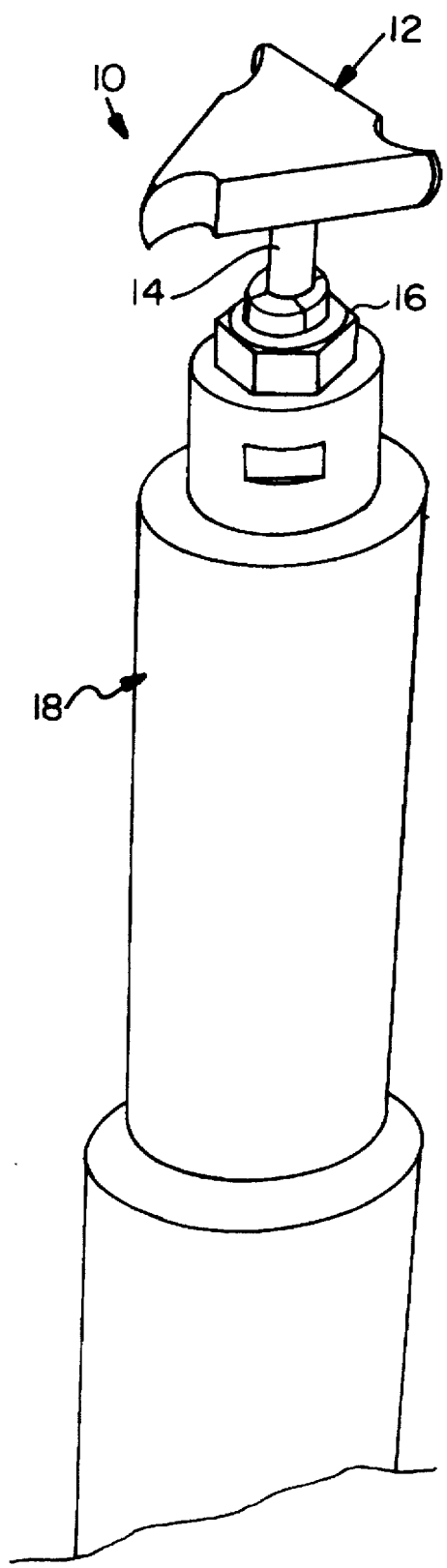
FIG. 1 is a perspective view of a hand-held rotary driven tool which includes a rotary cutting head of the invention.

In FIG. 1 there is shown one embodiment of rotary cutting tool 10 comprising triangular-shaped cutting head 12 secured to one end of an elongated mandrel or shaft 14. The other end of shaft 14 is secured in a hand-held rotary driver or power unit 18 by means of chuck 16. The power unit should drive the cutting head at a minimum speed of 2500 rpm, and it can operate at much higher speeds as well (e.g., 30,000 rpm). The power unit is of a type which is commercially available (e.g., a flex shaft handpiece, die grinder, etc.). It could also be a high speed stationary grinding unit.

The shaft 14 typically has a diameter of ⅛ to ¼ inch. The length of the shaft may vary, e.g., from about 1.5 to 2 inches. The shaft is preferably composed of high quality tool steel or equivalent material capable of withstanding impact and stress during use. The shaft should not bend, twist or break during normal operation of the cutting head. The shaft is secured to the geometric center of the cutting head, and the longitudinal axis of the shaft is perpendicular to the plane of the cutting head, as shown.

The triangular cutting head 12 is preferably composed of solid carbide (silicon carbide) and may be brazed to the outer end of the shaft 14 or secured to the shaft in other equivalent ways. Preferably the upper and lower faces of the cutting head are planar and parallel to each other.

One of the unique aspects of the rotary cutting tool of the invention is that it allows the user to make a deep cut or groove in bulk material (e.g., stone, wood, metal, bone, plastic, etc.) parallel to the rotation of the cutting head to thereby remove large quantities of material very quickly with a hand-held unit. The tool enables the user to make all desired cuts in a free-hand manner. Consequently, the tool is able to remove material much faster and more efficiently than is possible with hand-held chisels, rotary files, router bits, or abrasives.

The various possible contours of the cutting surfaces of the cutting head enable the user to cut and remove material so as to leave a desired texture or shape on the material being worked, or to add desired texture and design to the material.

Because the cutting head is preferably composed of carbide, it can be used to work a wide variety of different mediums without having to change cutting heads or stopping to re-sharpen or re-shape the cutting surface. The cutting head may also be composed of titanium diboride, if desired.

The diameter of the cutting head may vary, e.g., from about 0.25 to 3 inches. Preferably the diameter is in the range of about 0.5 to 1.25 inches. The thickness of the cutting head may also vary, as desired, e.g., from about 0.1 to 0.5 inch. Typically, a thickness of about 0.125 to 0.375 inch is used.

In the triangular-shaped cutting head there are three equidistantly spaced cutting points or edges (as illustrated in the drawings). FIG. 2A is a top view of the cutting head shown in FIG. 1. The cutting edges or points are labeled 12A, 12B and 12C. The cutting head of FIG. 2 is intended to be rotated in a clockwise manner (as viewed from the front). Ahead of and adjacent to each cutting point there is a recessed or cut-out area 13. In cutting head 12 these recessed areas are shown as being concave.

In cutting head 22, having cutting points 22A, 22B and 22C, there are recessed areas or cut-outs 15 ahead of and adjacent to each cutting point. In this embodiment the recessed areas have two walls which are perpendicular to each other. Other shapes for the recessed areas could also be used, if desired. The recessed areas ahead of the cutting points are for receiving bits of cut material which result from the contact of the cutting points with the object being worked. As the cutting head rotates, the loose bits of cut materials are removed from the cutting area and are then thrown away from the object being worked.

The triangular shape, which allows a three-point positioning of the cutting surfaces on the cutting head, allows the tool to dissipate heat in such a manner as to not build up any appreciable heat, and the spacing of the cutting surfaces nearly eliminates the problem of material build-up, as is common with rotary files or abrasives. The use of solid carbide or diboride as the material for the cutter head enhances the durability of the cutting edges, and increases the ability of the tool to maintain a cutting surface. Another unique aspect of this carving tool is that the user is able to observe the exact position of the cutting head as the cut proceeds, increasing the user's ability to make a precision cutting without the use of mechanical aides such as jigs, guides, or straight edges, but it does not preclude their use.

Figure 4:
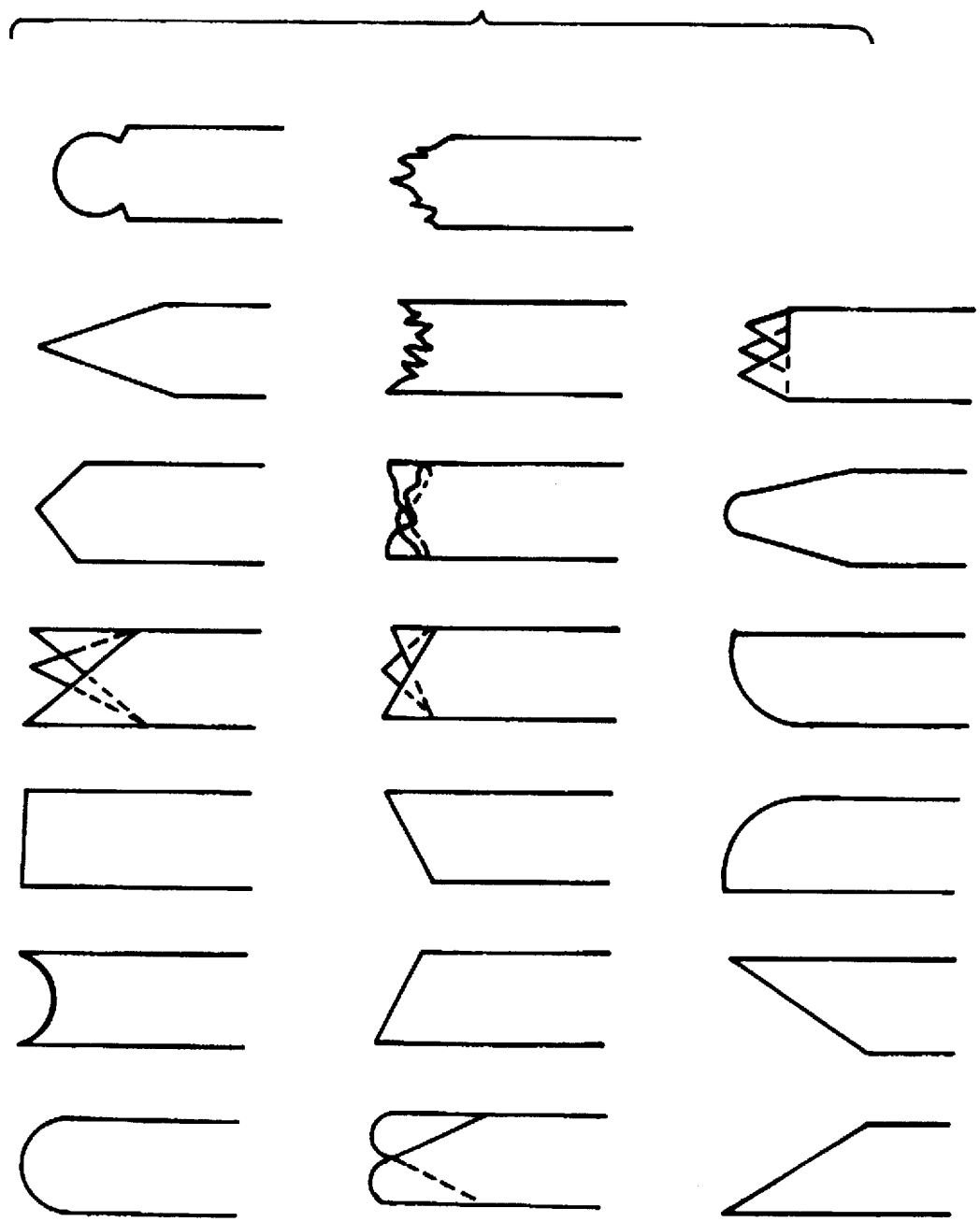
FIG. 4 illustrates side elevational views of a plurality of cutting edge profiles which may be used on rotary cutting tools of the invention.

In FIG. 4 there are shown side elevational views of a variety of cutting edge profiles which are useful in the cutting tools of this invention. For example, there are shown cutting edges which are convex, concave, tapered, pointed, square or flat, beveled, jagged, etc. Other shapes or profiles may also be used. More than one shape is possible on the same cutting edge.

It is also possible for the cutting heads to include more than three cutting points or edges (e.g., six) provided that they are equidistantly spaced apart around the periphery of the cutting head. It is very important to maintain balance of the cutting head so that it does not vibrate or wobble as it is rotated at higher speed.

Insofar as manufacture of the cutting head is concerned, the solid carbide or diboride head is first brazed to the mandrel by heating the entire unit in a kiln. The entire unit is then inserted into a jig for the grinding and shaping process. The leading edge of the point of each triangular head piece is ground away perpendicular to the opposite leg, and one-fourth of the way down to make the general cutting surface. The primary shape may also be curved (as shown in FIGS. 1 and 2A) to expedite the elimination of debris; if so, the asymptote at the cutting point must be perpendicular to the opposite side. The units are then inserted into the jig that is specific for the contour that is desired and ground to that contour. The width of the cutting edge determines the maximum cutting width. The profile of each cutting edge is ground to the specific shape to be cut in the material being worked and is then sharpened for maximum efficiency of cut. The angle of the cutting edge may vary according to the shape of the profile. All shaping of the cutting head must be done with diamond surfaced grinding wheels, with specific contours. All shaping is done with precisely programmed jigs.

Other variants are possible without departing from the scope of this invention. The drawings accompanying this application represent preferred embodiments of the invention.

What is claimed is:

1. A rotary chisel for use in a rotary power unit, said chisel comprising:
   (a) an elongated mandrel having first and second ends;
   (b) a triangularly shaped cutting head having three cutting points equidistantly spaced around the perimeter of said cutting head; wherein said cutting head is mounted on said first end of said mandrel; and wherein said cutting head is formed of three linear sides substantially equal in length, each side extending between a cutting point and a recessed area adjacent to another said cutting point.

2. A rotary chisel in accordance with claim 1, wherein said cutting head includes upper and lower planar faces which are parallel to each other.

3. A rotary chisel in accordance with claim 2, wherein said cutting head includes a geometric center, and wherein said first end of said mandrel is secured to said cutting head at said geometric center.

4. A rotary cutting tool comprising:
   (a) a hand-held power unit;
   (b) an elongated mandrel having first and second ends; wherein said second end is connected to and rotatably driven by said power unit;
   (c) a triangularly shaped cutting head having three cutting points equidistantly spaced around the perimeter of said cutting head; wherein said cutting head is mounted on said first end of said mandrel; and wherein said cutting head is formed of three linear sides substantially equal in length, each side extending before a cutting point and a recessed area adjacent to another said cutting point.

5. A rotary cutting tool in accordance with claim 4, wherein said cutting head includes upper and lower planar faces which are parallel to each other; Wherein said cutting head includes a geometric center, and wherein said first end of said mandrel is secured to said cutting head at said geometric center.

6. A rotary cutting tool comprising:
   (a) a hand-held power unit;
   (b) an elongated mandrel having first and second ends; wherein said second end is connected to and rotatably driven by said power unit;
   (c) a triangularly shaped cutting head having at least three cutting points equidistantly spaced around the periphery of said cutting head; wherein said cutting head is mounted on said first end of said mandrel; and wherein said cutting head is formed of three linear sides substantially equal in length, each side extending between a cutting point and a recessed area adjacent to another said cutting point.

* * * * *